July 24, 1962 W. G. BAIRD, JR., ETAL 3,045,285
METHOD FOR MAKING MULTILAYER SHEETS OF PLASTIC
Filed May 21, 1959

INVENTORS
WILLIAM G. BAIRD, JR.
JOHN W. HARRISON

BY Cushman, Darby & Cushman
ATTORNEYS

United States Patent Office 3,045,285
Patented July 24, 1962

3,045,285
METHOD FOR MAKING MULTILAYER SHEETS OF PLASTIC
William G. Baird, Jr., 28 Oneida Road, and John W. Harrison, 47 Yale St., both of Winchester, Mass.
Filed May 21, 1959, Ser. No. 814,848
12 Claims. (Cl. 18—48)

This invention relates to the combination of thin film layers into a thicker film.

The extrusion and biaxial orientation of thick plastic films (e.g. films of thickness over 2 mils) is very difficult.

Accordingly, it is an object of the present invention to prepare thick films of biaxially oriented plastic by an improved procedure.

Another object is to prepare thick films of biaxially oriented plastics having superior shrink energy. An additional object is to prepare thick films of biaxially oriented plastics having improved puncture and abrasion resistance.

A further object is to devise a method for forming thick films from thinner films of biaxially oriented plastic.

Figure 1:
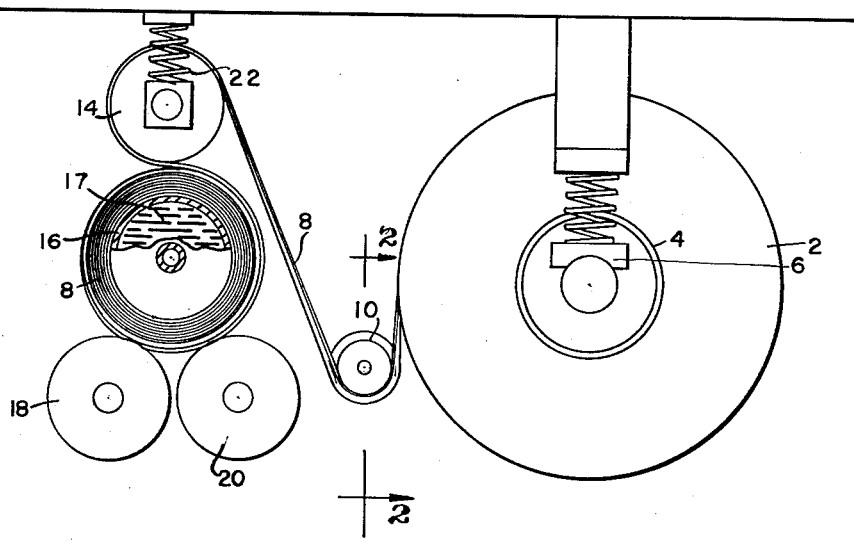
Figure 2:
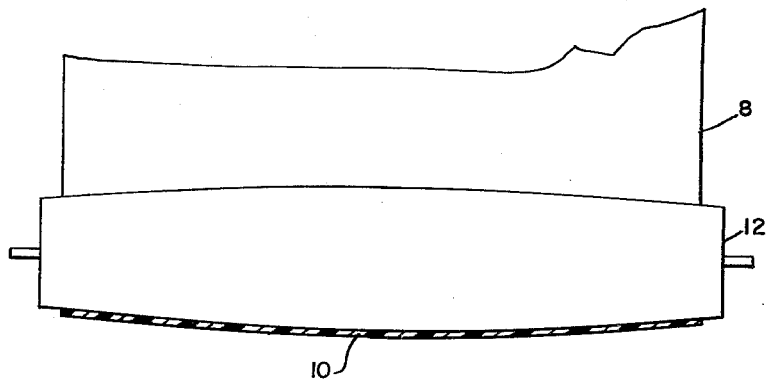

Other objects and advantages of the present invention will become apparent in the following detailed description of the invention, wherein reference is made to the accompanying drawings in which:

FIGURE 1 is a schematic representation of the process and apparatus of the invention; and FIGURE 2 is a sectional view along the line 2—2 of FIGURE 1.

Referring more specifically to the drawings there is provided a roll 2 of 0.8 mil thick film prepared from Alathon 14 (polyethylene molecular weight about 20,000 density 0.916) which had been irradiated to an extent of 12 megarad and had then been stretched 350% longitudinally and 350% laterally and had a shrink energy of 250 p.s.i. at 96° C. The roll of film has a cardboard core 4. To slow down or to stop the unwinding of the roll of film, there is provided a spring actuated brake 6. The film 8 after leaving the roll 2 passes over the convex surface 10 of crowned spreader roll 12 to insure the removal of any wrinkles which might occur in the film. The crowned spreader roll spreads out the film in the form of an arc having a crown and in which the crown of the arc is at the center of the film. The film then passed over driven roll 14 and then was wound around a 1.5 inch diameter wooden mandrel or core 16. There are also provided a front idle roller 18 and a rear idle roller 20. The core 16 is inserted from the front with the film 8 held tight against the front idle roller 18. The film is wound around the core sufficient times to give the desired thickness, e.g., to give a thickness of 9.6 mils, it is wound around the core 12 times. Driven roll 14 is constantly urged downwardly by spring 22 to maintain tension on the multiple layers of film. (For clarity, the roll stands have been omitted from the drawings.)

The outside edge of the last layer was tacked down using a conventional impulse sealer and the excess was trimmed. The core 16 was baked for 15 minutes at 200 to 210° F. The core was heated by hot fluid, e.g., water in inner tube 17 which was connected to the source of hot fluid after the layers of film had been applied to the core. Then the core was cooled, and the film cut and peeled off to produce a bubble-free, wrinkle-free product. The layers of the irradiated biaxially oriented polyethylene film could be separated only with considerable difficulty.

In another experiment there was used 0.75 mil saran film (a copolymer of 85% vinylidene chloride and 15% vinyl chloride), and a thickness of 11.25 mils was obtained by winding the film around the core 15 times. The baking at 200 to 210° F. essentially fused the saran layers together so that they could not be separated.

While heat was applied internally to the drum surface in the examples, it can equally well be applied externally to the film surface or to both the internal drum surface and film surface in combination. The heating causes the biaxially oriented heat shrinkable film layers to shrink into close contact with one another and with the cylindrical drum or mandrel. The tension required in the winding is only necessary for the exclusion of air between the layers. The heat required need only be enough to heat the film to its shrink-release temperature briefly and should be followed by cooling while still on the mandrel, so that further shrinking will not occur upon removal from the mandrel. The film layers can then either be cut across the drum or mandrel and peeled as a unit, or the mandrel collapsed to permit removal of the tube or sleeve formed. If it is desired to make a bag or pouch from this tube, it need only be pressed flat and one end sealed by use of a thermal bar, radio frequency, or impulse sealer, as is common with shrinkable film.

Generally, the thin film has a thickness of less than 2 mils, and the finished thick film has a thickness of at least 8 mils. As the biaxially oriented heat shrinkable plastic film, there can be employed vinylidene chloride polymers (e.g. a copolymer of 85% vinylidene chloride and 15% vinyl chloride or a copolymer of 75% vinylidene chloride and 25% vinyl chloride) biaxially stretched in the manner shown in Stephenson, Patent No. 2,452,080.

There can also be used irradiated biaxially oriented polyethylene film which has been irradiated to an extent of 2 to 100 megarad, preferably 6 to 20 megarad. The irradiation and biaxial orientation can be carried out as described in Rainer Patent 2,877,500 and Baird application, Serial No. 713,848, filed February 7, 1958. The biaxial orientation is usually carried out to an extent of 100 to 700% longitudinally and 100 to 900% laterally. The irradiated, biaxially oriented polyethylene has a high shrink energy, e.g. 100 to 1000 p.s.i. at 96° C. Other heat shrinkable biaxially oriented plastic films which can be used include polypropylene, vinyl chloride resins, polystyrene, Mylar (polyethylene terephthalate), nylon (e.g. polymeric hexamethylene adipamide), etc.

What is claimed is:

1. A method for converting thin film of a heat shrinkable plastic into thicker film of uniform thickness of said plastic comprising the steps of winding a plurality of layers of the thin film around a mandrel while maintaining sufficient tension on the film during the winding to exclude air from between the layers, then applying sufficient heat to said layers of film to cause the layers to shrink into closer contact with one another and with the mandrel, and removing the thus formed thicker film from said mandrel.

2. A method according to claim 1 wherein the plastic is a biaxially oriented vinylidene chloride polymer.

3. A method according to claim 1 wherein the plastic is biaxially oriented irradiated polyethylene, the irradiation being to an extent of at least 2 megarad.

4. A method for converting thin film of a heat shrinkable biaxially oriented plastic into thicker film of uniform thickness of said plastic comprising the steps of: winding a plurality of layers of the thin film from a film supply around a mandrel positioned between opposed rollers, urging at least one of said opposed rollers toward said mandrel to maintain sufficient tension on the film to exclude air from between the layers, then applying sufficient heat to said layers of film while maintained around said mandrel and while said mandrel is between said rollers, to cause the layers to shrink into closer contact with one another and with said mandrel and removing the thus formed thicker film from said mandrel.

5. A method according to claim 4 including the step of sealing the outside edge of the top layer of film around said mandrel to the next layer prior to heat shrinking the layers of film.

6. A method according to claim 5 including the step of cutting the film after heat shrinking to remove the film from the mandrel.

7. A method according to claim 6 wherein the mandrel is of the collapsible type, and including the step of collapsing the mandrel and removing the film as a tube therefrom.

8. A method according to claim 6 wherein the film is made of a biaxially oriented vinylidene chloride polymer.

9. A method according to claim 6 wherein the film is made of irradiated, biaxially oriented polyethylene wherein the irradiation is to an extent of at least 2 megarad.

10. A method according to claim 6 including the step of spreading out the thin film in the form of an arc having a crown disposed at the center of the film prior to winding the film onto the mandrel to thereby remove wrinkles from the thin film.

11. A method according to claim 6 wherein the thin film has a thickness of not over 2 mils and the thick film has a thickness of at least 8 mils.

12. A method for converting thin film of a heat shrinkable plastic into thicker film of uniform thickness of said plastic comprising winding a single layer of the thin film a plurality of times around a mandrel to make plural layers while maintaining sufficient tension on the film during the winding to exclude air from between the layers thus formed, then applying sufficient heat to said layers of film to cause the layers to shrink into closer contact with one another and with the mandrel, and removing the thus formed thicker film from said mandrel.

References Cited in the file of this patent

UNITED STATES PATENTS

| | | |
|---|---|---|
| 1,092,129 | Spencer | Mar. 31, 1914 |
| 1,648,475 | Darwin | Nov. 8, 1927 |
| 1,811,067 | Valle | June 23, 1931 |
| 2,034,731 | Saalbach | Mar. 24, 1936 |
| 2,221,470 | Brown | Nov. 12, 1940 |
| 2,223,017 | Abrams et al. | Nov. 26, 1940 |
| 2,421,132 | Tornberg | May 27, 1947 |
| 2,434,541 | Bierer | Jan. 13, 1948 |
| 2,442,443 | Swallow | June 1, 1948 |
| 2,452,080 | Stephenson | Oct. 26, 1948 |
| 2,586,820 | Hemperly et al. | Feb. 26, 1952 |
| 2,635,065 | Nashley | Apr. 14, 1953 |
| 2,690,206 | Mueller | Sept. 28, 1954 |
| 2,702,772 | Pronio | Feb. 22, 1955 |
| 2,739,350 | Lampman | Mar. 27, 1956 |
| 2,920,349 | White | Jan. 12, 1960 |
| 2,952,201 | Gibson | Sept. 13, 1960 |
| 3,000,776 | Swenson | Sept. 19, 1961 |

FOREIGN PATENTS

| | | |
|---|---|---|
| 153,991 | Sweden | Apr. 3, 1956 |

UNITED STATES PATENT OFFICE
CERTIFICATE OF CORRECTION

Patent No. 3,045,285                               July 24, 196

William G. Baird, Jr., et al.

It is hereby certified that error appears in the above numbered patent requiring correction and that the said Letters Patent should read as corrected below.

In the grant, lines 1 to 3, for "William G. Baird, Jr., an John W. Harrison, both of Winchester, Massachusetts," read -- William G. Baird, Jr., and John W. Harrison, both of Winches Massachusetts, assignors to W. R. Grace & Co., of Cambridge, Massachusetts, a corporation of Connecticut, --; line 12, for "William G. Baird, Jr., and John W. Harrison, their heirs" read -- W. R. Grace & Co., its successors --; in the heading to the printed specification, lines 4 and 5, for "William G. Baird, Jr., 28 Oneida Road, and John W. Harrison, 47 Yale St., both of Winchester, Mass." read -- William G. Baird, Jr., and John W. Harrison, both of Winchester, Mass., assignors to W. R. Grace & Co., Cambridge, Mass., a corporation of Connecticut --.

Signed and sealed this 27th day of November 1962.

(SEAL)
Attest: ESTON G. JOHNSON
~~ERNEST W. SWIDER~~

Attesting Officer

DAVID L. LADD

Commissioner of Patents